United States Patent [19]

Kruger

[11] 4,047,830

[45] Sept. 13, 1977

[54] DRILLING TOOL

[75] Inventor: Heinrich Kruger, Essen, Germany

[73] Assignee: Fried. Krupp Gesellschaft mit beschrankter Haftung, Essen, Germany

[21] Appl. No.: 685,919

[22] Filed: May 12, 1976

[30] Foreign Application Priority Data

May 26, 1975  Germany .................. 2523201

[51] Int. Cl.² .............. B23B 31/10; B23B 51/00; B23B 27/14
[52] U.S. Cl. .................. 408/239 A; 408/144; 408/186
[58] Field of Search ........... 408/144, 713, 186, 238, 408/239

[56] References Cited

U.S. PATENT DOCUMENTS 1,746,381  2/1930  Davis ........................ 408/238 X
2,934,113  4/1960  Hollien ...................... 408/144 X
3,915,585  10/1975 Eckle ........................ 408/713 X Primary Examiner—Harrison L. Hinson
Attorney, Agent, or Firm—Spencer & Kaye

[57] ABSTRACT

A drilling tool, particularly for working metals, in which a tool holder is provided at its frontal or end surface with a receiving slot which is open on three sides and in which an interchangeable blade type drill bit is fastened. A bar-shaped adapter is symmetrically inserted into the receiving slot between the drill bit and the bottom surface of the slot. The adapter extends laterally beyond the periphery of the tool holder with one end surface abutting the bottom surface of the slot and the opposite end surface contacting and providing an abutment for at least the portions of the blade shaped drill bit which extend laterally beyond the periphery of the tool holder.

13 Claims, 10 Drawing Figures

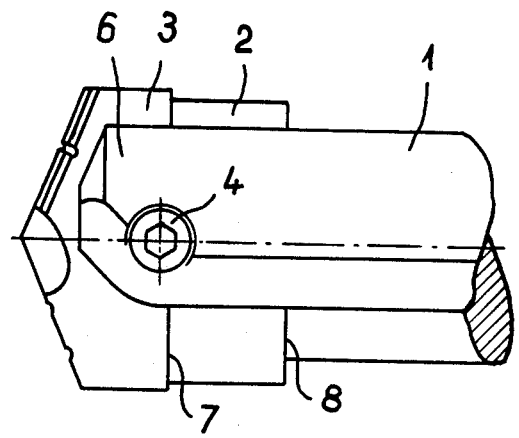
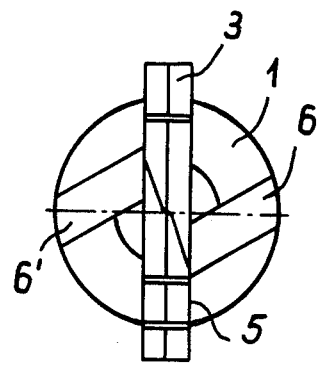
FIG. 1    FIG. 2
FIG. 4    FIG. 3
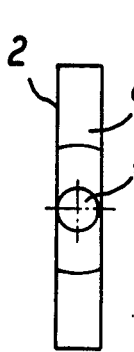
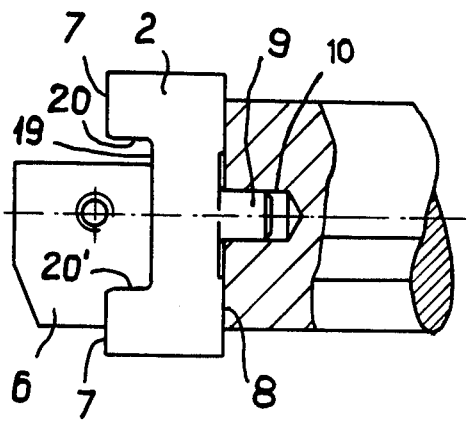

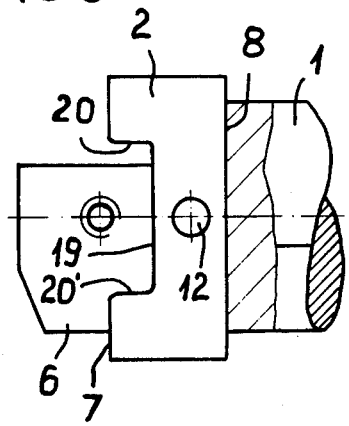
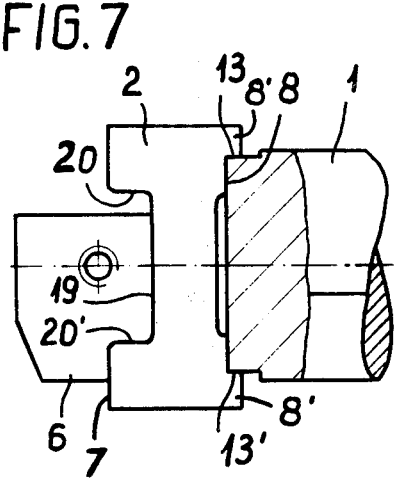
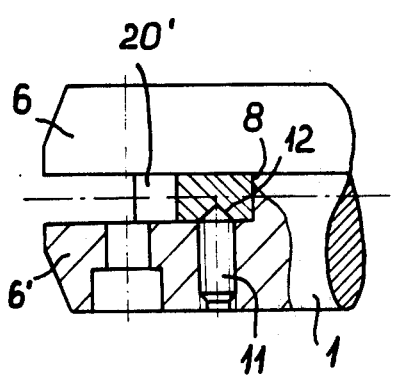
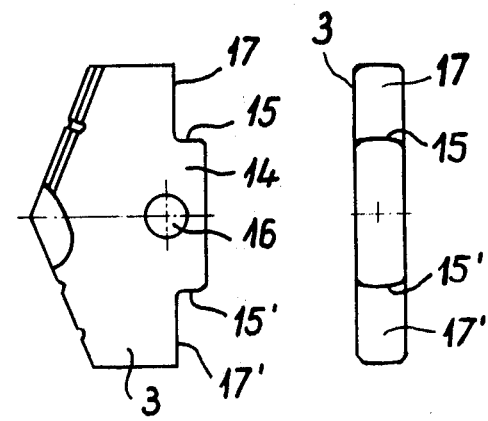
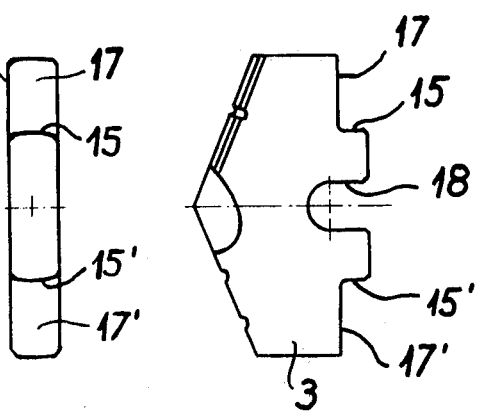

DRILLING TOOL

BACKGROUND OF THE INVENTION

The present invention relates to a drilling tool, particularly for working metals, in which a tool holder is provided with a receiving slot, which is open on three sides in its frontal or end surface, and an interchangeable drill blade is fastened in the receiving slot.

For deep drilling metallic materials, particularly steel materials, in addition to one-piece spiral drills, drilling tools are employed which comprise a drill rod and a drill bit inserted therein. In such a composite drilling tool, special requirements must be met with respect to stability as well as wear resistance of the drill bit.

For drilling deep holes where the ratio of hole diameter to hole depth may be 1:100, for example, deep hole drills are known in which a hard metal drill blade is soldered into a recess on the drill head. Deep hole drills have one cutting edge and have an asymmetrical design of the cutting edge with an eccentric cutting tip. The eccentrically arranged drill blade terminates substantially with the edge region of the drill head.

Due to the eccentric design of the cutting edge, it is necessary, particularly when starting to drill, to guide the drill head via a drill sleeve. Guide strips are also provided which prevent lateral escape of the drill head.

For the production of holes of a shallower depth, such deep hole drills cannot be used because the additional devices required for starting the hole, e.g., drill sleeves and guide strips, and for the intake and discharge of drilling oil are too complicated for this purpose. Moreover when the diameter of the drilled hole is to be changed, complete drill heads including the associated accessories must be interchanged.

Drilling tools have been proposed for producing holes of shallow depths in which a drill bit made of a high-speed steel is inserted into a receiving slot in a drill shaft or rod and is fastened by means of a screw. Such a drill generally operates with drill water, an emulsion of water and oil, to cool the cutting edge and to transport the borings out of the hole. When such holes are drilled without guides it is important that the drill bit have a stable position. In order to center and secure the drill bit in the drill shaft, the bit is provided with an external centering means in that the drill bit is provided with two centering protrusions in its outer region which enclose the drill shaft. This imparts a certain length to the drill bit. Such drilling tools are used in particular for holes with more than 20 mm diameter so that the drill bit is rather large. The drawback of such an embodiment is, inter alia, that the external centering means do not provide stable axial support.

The advancing force during drilling, particularly if the drill bit is significantly broader than the drill shaft, is absorbed only by an abutment in the order of magnitude of the diameter of the drill shaft. Additionally there exist considerable bending stresses in the bit due to the size of the bit with its external centering means. The high cutting forces occurring during deep drilling — with a drill diameter of 40 mm, for example, the advancing force is about 11,000, N — must be able to be transferred by the drill bit to the tool shaft so that optimum abutment and support of the drill bit are important. Finally, a relatively large amount of high-speed steel is required for a large drill blade bit which is distinguished by its toughness but is not wear resistant enough for use in a high performance drill.

SUMMARY OF THE INVENTION

It is the object of the present invention to provide a drill for drilling holes of shallower depths which avoids the above-mentioned drawbacks and which provides in particular a stable axial contact for the drill bit, reduces bit size and consequently increases resistance against bending stresses and makes it possible to quickly equip a tool holder wih drill bits of various widths.

A further object of the invention is to provide a drill which is additionally significantly more wear resistant and thus has a much improved lifetime.

The above objects are accomplished according to the present invention for a drill tool, which is intended particularly for working metals and which includes a tool holder provided at its frontal or end surface with a receiving slot which is open on three sides, an interchangeable blade type drill bit positioned in the slot and a means for fastening the drill bit in the slot, in that a bar-shaped adapter having contact surfaces which protrude or extend laterally beyond the periphery of the tool holder is symmetrically inserted in the receiving slot between the drill bit and the bottom surface of the slot to provide support for the drill bit.

The adapter which is introduced into the center of the receiving slot contacts the bottom surface of the slot with one of its end surfaces. On its other opposite end surface, the adapter preferably has a recess of a size which is adapted to a protrusion in the adjacent surface of the drill bit so that the bit is guided in the recess of the adapter with precise fit. Adjacent the alignment surfaces the drill bit is provided with axial abutment surfaces in its edge region, with these surfaces being arranged perpendicular to the longitudinal axis of the tool and being provided to support the drill bit on the corresponding abutment surface or surface portions of the adapter. This provides a stable axial support for the drill bit over a surface which exceeds the diameter of the tool holder.

The drill bit is clamped into the slot-shaped recess of the tool holder by a clamping force provided by screwing together the two clamping tongues formed by the two sides of the tool holder forming the recess. In this connection it is advantageous for good clamping of the bit that the depth of the recess is greater than the clamping depth of the drill bit. The two clamping tongues of the tool holder can easily be screwed together and assure uniform clamping of the drill bit.

The adapter is not clamped together with the bit, a fact that is accomplished, for example, by giving the adapter a thickness which is a little less than that of the bit.

A tool holder may have associated to it bits of various diameters. In order to provide optimum axial support to the various size drill bits, the bits have associated to them graduated adapters with the same connecting dimensions.

If the diameter of the drill hole is to be changed, the same tool holder can still be used, it is merely necessary to exchange the drill bit and its matching adapter. This results in an additional advantage if the adapter is made of a material which is resistant to wear and axial pressures, so that damage to the tool holder from borings or excess stresses is substantially avoided.

Advisably the adapter is provided with a means for centering same on the tool holder. This means may be a centering pin protruding from the surface of the adapter facing the bottom of the receiving slot so as to provide accurate centering. According to a preferred embodiment, however, the adapter may also be centered in that two external centering protrusions are provided on the outer region of the surface of the adapter facing the bottom of the receiving slot, which protrusions engage the outer periphery of the tool holder. According to a further advisable embodiment, the adapter is fixed on the tool holder by an additional fastening means, for example, a threaded pin which engages in a conical recess in a surface of the adapter.

According to a particularly preferred embodiment of the invention, the centering protrusion on the end surface of the drill bit facing the adapter is provided with a rectangular cross section. This centering protrusion has such a size that it fits exactly into the recess in the adjacent surface of the adapter.

In this way it is possible to substantially reduce the size of the drill bit, and the otherwise required protrusions along the edge of the bit for external centering are eliminated. The reduced bit size leads to reduced bending stresses on the bit since the clamping area is shorter. The fastening hole through which the fastening screw for the drill bit passes is disposed in the area of the protrusion. Instead of a simple circular fastening hole, preferably the drill bit is provided with a recess which extends along the center of the centering protrusion and which is open in the direction of the adapter.

According to a quite particularly preferred embodiment, the drill bit is made of a hard metal. By designing the bit according to the present invention, its size is greatly reduced so that the costs for the blade material can be reduced to a considerable extent. At the same time a drilling tool with a hard metal drill bit has a significantly longer lifetime. Since external and internal working of workpieces, for example in automatic multiple spindle machines or numerically controlled turning lathes, often occur simultaneously, the operating conditions can be optimized by using cutting materials of hard metal for the internal as well as the external working. According to this embodiment, the lifetime of the tool is doubly improved, i.e., due to improved and more stable clamping and support of the drill bit as well as due to increased wear resistance of the hard metal material.

BRIEF DESCRIPTION OF THE DRAWINGS

FIG. 1 is a side view of a drilling tool according to the invention.

FIG. 2 is a front view of the drilling tool of FIG. 1.

FIG. 3 is a side view, partially in section, of a drilling tool showing the tool holder and one embodiment of an adapter according to the invention.

FIG. 4 is an end view of the surface of the adapter of FIG. 3 which faces the tool holder.

FIG. 5 is a side view, partially in section, of a drilling tool showing another embodiment of an adapter according to the invention.

FIG. 6 is a top view, partially in section, of the tool holder and adapter of FIG. 5.

FIG. 7 is a side view, partially in section, of a drilling tool showing the tool holder and still another embodiment of an adapter according to the invention.

FIG. 8 is a side view of a drill bit according to the invention with a fastening hole in the area of its protrusion.

FIG. 9 is a view of the end surface of the drill bit of FIG. 8 which faces the adapter showing the preferably rounded reference surfaces.

FIG. 10 is a side view showing a modification of the drill bit of FIG. 8.

DETAILED DESCRIPTION OF THE PREFERRED EMBODIMENTS

Referring now to FIGS. 1 and 2, there is shown a drilling tool according to the invention including a tool holder or rod 1 having a receiving slot 5 formed in the end surface of the holder 1 with the slot 5 being open on three sides. Disposed in the slot 5 is a blade shaped drill bit 3. The drill bit 3 is fastened and clamped in the slot 5 by means of a bolt or screw 4 which passes through a hole in the drill bit 3 and, when tightened, forces the two portions 6 and 6' of the tool holder 1, which portions define sides of the slot 5 and act as clamping tongues, toward each other and against the side surfaces of the drill bit 3 in a clamping action.

Symmetrically disposed in the slot 5 between the drill bit 3 and the bottom surface of the recess is a bar-shaped adapter 2 which extends laterally beyond the periphery of the tool holder 1. The adapter 2 has a sufficient length so that one substantially planar end surface 8 contacts and abuts against the surface defining the bottom of the slot 5 while its opposite substantially planar end surface 7 contacts and abuts the adjacent end surface of the drill bit 3. In this manner, the drill bit 3 is axially supported on the contact surface 7 of adapter 2, which itself is supported by the tool holder 1 via the contact surface 8. As is evident drill bits 3 for various hole diameters can be installed very simply in the receiving slot 5 of tool holder 1. In order that the axial support of the drill bit 3 provided by adapter 2 be effective when different size drill bits 3 are used, an adapter 2 which is matched to the diameter of the drilled hole is associated to each drill bit. That is, for each size drill bit an adapter which extends laterally beyond the periphery of the tool holder for a distance sufficient to provide the necessary extent of the support surface 7.

The adapter 2 is advisably provided with an arrangement for centering same on the tool holder 1 within the slot 5. FIGS. 3-5 show various arrangements for providing this centering of the adapter 2. As shown in FIGS. 3 and 4 the adapter 2 is provided with a centering pin 9 which protrudes from the surface 8 and engages in a blind axial bore 10 which is provided in the surface of the tool holder 1 defining the bottom of the slot 5 and which has a diameter which mates with that of the pin 9. According to the embodiment of the adapter 2 shown in FIGS. 5 and 6, the adapter 2 is centered on the tool holder 1 by means of a threaded pin or set screw 11 which is threadingly mounted in one of the clamping tongues 6 or 6' and engages a conical recess 12 centrally disposed in one side surface of the adapter 2. Preferably, however, as shown in FIG. 7, the adapter 2 is centrally aligned by providing the surface 8 with two projections 8' which matingly engage two axially extending reference surfaces 13 and 13' formed on the outer periphery of the tool holder 1.

As shown in each of FIGS. 3, 5 and 7, the surface 7 of the adapter 2 is provided with a centrally disposed recess 19 which serves to radially position the drill bit 3. To achieve this result, as shown in FIG. 8, the end surface of the drill bit 3 facing the adapter 2, i.e., the surface of the drill bit 3 opposite that containing the cutting edge, is provided with an axial protrusion 14 which extends along the longitudinal axis of the tool holder and has a shape which matingly engages the recess 19 formed in the adapter 2. As shown, the protrusion 14, and consequently the recess 19, preferably have a rectangular cross section with the actual radial alignment being provided by the contacting of the two plane parallel alignment surfaces 15 and 15' with the corresponding surfaces 20 and 20' of recess 19 (see FIGS. 3 and 5-7). The planar portions 17 and 17' of the end surface of drill bit 3 adjacent the protrusion 14, which surfaces extend to the outer periphery of the drill bit 3 and are perpendicular to the longitudinal axis of the tool holder 1, serve as the axial contacts for the drill bit 3 and engage the adjacent portions of the end surface 7 of the adapter 2. As shown in FIG. 8, the fastening hole 16 through which the bolt 4 extends is disposed in the area of the protrusion 14 along the longitudinal axis of the tool holder 1.

As shown in FIG. 9, instead of a protrusion 14 with plane parallel alignment surfaces 15 and 15', these alignment or reference surfaces 15 and 15' may be convexly rounded. The outer diameter of the drill bit 3 and the two reference surfaces 15 and 15' can be ground with this type of attachment.

Instead of the circular fastening hole 16 of FIG. 8, as shown in FIG. 10 the fastening hole may be in the form of an axial or longitudinal recess 18 which is open in the direction toward the adapter 2. This has the advantage that it is merely necessary to loosen the fastening screw 4 but it is not necessary to remove same.

It should be noted that the present application is not limited to a tipped drill bit 3 as shown in FIGS. 1, 8 and 10, but may be utilized with other cutter shapes, such as stepped blades or countersinking blades.

Preferably, the drill bit 3 is made of hard metal, such as cemented metal carbide.

It will be understood that the above description of the present invention is susceptible to various modifications, changes and adaptations, and the same are intended to be comprehended within the meaning and range of equivalents of the appended claims.

What is claimed is:

1. In a drilling tool, particularly for working metals, including a tool holder having a receiving slot which is open on three sides formed in its end surface, an interchangeable blade type drill bit inserted in said slot, and means for fastening said drill bit in said slot, the improvement comprising a bar-shaped adapter symmetrically disposed in said receiving slot between said drill bit and the bottom surface of said receiving slot, said adapter extending laterally beyond the periphery of said tool holder for a distance equal to or slightly less than the lateral expanse of said drill bit, said adpater having a first end surface which abuts said bottom surface of said receiving slot and a second opposite end surface which contacts and provides an abutment for at least the portions of the adjacent end surface of said blade shaped drill bit which extend beyond the periphery of said tool holder, said adjacent end surface of said drill bit being opposite the end surface thereof containing the cutting tip of the drill bit; a recess formed in the center of said second end surface of said adapter; and a mating protrusion formed on said adjacent end surface of said drill bit for centering said drill bit.

2. A drilling tool as defined in claim 1 wherein: said means for fastening said drill bit in said tool holder comprises a bolt extending transverse to the longitudinal axis of said tool holder between the two portions of said tool holder defining the sides of said receiving slot and through an opening in said drill bit; and said opening is a recess extending along the longitudinal axis of said drill bit for the length of said protrusion and being open in the direction toward said adapter.

3. A drilling tool as defined in claim 1 wherein said protrusion has a substantially rectangular cross section.

4. A drilling tool as defined in claim 3 wherein the edge surfaces of said protrusion are convexly rounded.

5. A drilling tool as defined in claim 1 further comprising means for centering said adapter within said slat.

6. A drilling tool as defined in claim 5 wherein said centering means comprises a centering pin extending from said first end surface of said adapter and a mating recess formed in said bottom surface of said receiving slot along the longitudinal axis of said tool holder.

7. A drilling tool as defined in claim 5 wherein said means for centering said adapter comprises: a pair of centering protrusions extending from said first end surface of said adapter at the outer edges thereof and matingly engaging the periphery of said tool holder.

8. A drilling tool as defined in claim 5 wherein said means for centering said adapter comprises: means for releasably fastening said adapter to said tool holder.

9. A drilling tool as defined in claim 1 wherein said drill bit is made of a hard metal.

10. A drilling tool as defined in claim 1 wherein the abutting portions of said first end surface of said adapter and said bottom surface of said receiving slot and of said second end surface of said adapter and said adjacent surface of said drill bit are planar.

11. A drilling tool as defined in claim 1 wherein said recess in said adapter is located along the longitudinal axis of said tool holder.

12. A drilling tool as defined in claim 1 wherein: said means for fastening said drill bit in said tool holder comprises means for releasably clamping said drill bit directly between the two portions of said tool holder defining the sides of said receiving slot.

13. A drilling tool as defined in claim 12 wherein said means for releasably clamping comprises a bolt extending transverse to the longitudinal axis of said tool holder between said two portions of said tool holder and through an opening in said drill bit located on the longitudinal axis of said drill bit.

* * * * *